United States Patent [19]

Wu

[11] Patent Number: 5,703,661
[45] Date of Patent: Dec. 30, 1997

[54] IMAGE SCREEN ADJUSTMENT APPARATUS FOR VIDEO MONITOR

[75] Inventor: Trans Wu, Taipei Hsien, Taiwan

[73] Assignee: Amtran Technology Co., Ltd., Taipei Hsien, Taiwan

[21] Appl. No.: 654,543

[22] Filed: May 29, 1996

[51] Int. Cl.$^6$ ............................................. H04N 5/67
[52] U.S. Cl. ...................... 348/673; 348/686; 348/687; 345/212
[58] Field of Search ................................ 348/678, 686, 348/687, 673, 674, 569; 345/212; H04N 5/67

[56] References Cited

U.S. PATENT DOCUMENTS

| | | | |
|---|---|---|---|
| 4,005,262 | 1/1977 | Fijisawa et al. | 348/673 |
| 5,063,607 | 11/1991 | FitzHenry et al. | 348/678 |
| 5,072,299 | 12/1991 | Park | 348/686 |
| 5,317,401 | 5/1994 | Dupont et al. | 348/678 |
| 5,345,278 | 9/1994 | Choi | 348/686 |
| 5,446,483 | 8/1995 | Duley | 348/686 |

*Primary Examiner*—Glenton B. Burgess
*Attorney, Agent, or Firm*—Baker & McKenzie

[57] ABSTRACT

A control apparatus adapted to adjust the image screen display characteristics of a video monitor. The apparatus comprises a microprocessor, an encoder, and a rotary input signal processor. The microprocessor implements operation and adjustment control of the monitor. The encoder provides a rotary knob that a user of the monitor device may rotate in either direction for generating a pair of pulse signals. The rotary input signal processor is coupled between the microprocessor and the encoder for receiving the pair of pulse signals generated by the encoder and reshaping the pulses for input to the microprocessor. The microprocessor receives the reshaped pulse signals to determine the direction of rotation and the range of rotation of the encoder. The determined direction and speed of rotation are utilized as the basis for the adjustment of the image screen of the video monitor device. The microprocessor further determines the speed of rotation of the encoder utilizing the received reshaped pulse signals for adjusting the image screen. The image screen is adjusted in a manner corresponding to the determined speed of rotation of the encoder wherein a faster rotation corresponds to faster image screen adjustment.

5 Claims, 9 Drawing Sheets

Prior Art

IMAGE SCREEN ADJUSTMENT APPARATUS FOR VIDEO MONITOR

BACKGROUND OF THE INVENTION

1. Field of the Invention

The present invention relates in general to a control apparatus for video monitors, and in particular, to an image screen adjustment apparatus for video monitors. More particularly, the present invention relates to an image screen adjustment apparatus for video monitors that provides a fine feeling of control as that of an analog rotary knob adjustment.

2. Technical Background

Early video monitors process analog video signal and utilize a number of analog style control knobs (which are normally variable resistors coupled thereto) for the display monitor control functions such as horizontal and vertical shifts, vertical magnification, contrast and brightness, etc. Such control knob arrangement for monitor display adjustment, although considered basically suitable for those monochrome, single-frequency black-and-white video monitors, is somewhat confusing for users of modern multiple-frequency color display monitors. In other words, this analog-style control knob arrangement is only allowed for use under predetermined and limited number of timing modes. For different monitor design specifications and different display adapter boards, circuit design changes and modifications to printed circuit board layout may have to be implemented, which constitutes great problem and causes trouble for both monitor designer and manufacturer.

In order to solve the above-described problem, control circuitry for display monitors have gradually moved into the arena of digital control. Microprocessors are used in these digital control circuitries to implement display control. With microprocessor display control logic, different display monitor designs can be implemented utilizing the same digital controller logic, with the only requirement that the firmware and database for the particular microprocessor be modified accordingly. No controller logic hardware circuitry design would have to be altered. This has provided great flexibility and convenience for both designer and manufacturer of video display monitors. Within the hardware configuration of the digital controller for display monitors, push buttons are normally provided on the control panel for user's access to facilitate the display adjustment. One practice for implementing the video display monitor control has been employing two push buttons identified by plus ("+") and minus ("−") symbols respectively for each of the controlled functions including horizontal and vertical shifting, vertical magnification, contrast, and brightness of the displayed screen. Another practice, on the other hand, has been utilizing a pair of arrow-headed buttons identified by right- ("→") and left-pointing ("←") arrow symbols for the user of a video display monitor to select one from a menu of functions to be adjusted, and then utilizing another pair of buttons having identified by the plus and minus symbols respectively to facilitate the adjustment.

However, push button digital controls for video display monitors have been criticized of being not so user-friendly. When compared to the traditional analog-style control knobs, which provide continuous and smooth as well as corresponding fast and slow changes in the display screen when the knob is turned quick and slow respectively for the controlled function being adjusted, digital push buttons lacks the smoothness and the fine feel of total control. Screen changes in response to the depressed push button in a discontinuous manner, and the speed of adjustment is difficult for a user to control. Further, if large scale adjustment were desired, either a great many push-button depressing actions will have to be performed, or a sustained and long period of push button depressing time will have to be dispensed. This represents a much awkward adjustment feeling for quite many of the video display monitor users with such digital push button controls.

SUMMARY OF THE INVENTION

It is therefore an object of the present invention to provide an image screen adjustment apparatus for video display monitors that employs digital rotary control knobs coupled to encoders for providing image screen adjustment for a user in a manner corresponding to the speed of user's rotation at the control knob, in order to achieve fine feeling over the control of the adjustment.

It is another object of the present invention to provide an image screen adjustment apparatus for video display monitors that employs a single digital rotary control knob coupled to an encoder and a function key governed under a firmware routine to implement the image screen adjustment based on an on-screen display provided on the screen of said monitor.

The present invention achieves the above-identified objects by providing an image screen adjustment apparatus for video display monitors that comprises a microprocessor, an encoder, and a rotary input signal processor means. The microprocessor implements operation and adjustment control of the monitor, the encoder provides for a user of the monitor device to route in either direction for generating a pair of pulse signals, while the rotary input signal processor means is coupled between the microprocessor and the encoder for receiving the pair of pulse signals generated by the encoder and reshapes the pulses for input to the microprocessor. The microprocessor receives the reshaped pulse signals to determine the direction of rotation and the range of rotation of the encoder. The determined direction and speed of rotation are utilized as the basis for the adjustment of the image screen of the video monitor device. The microprocessor further determines the speed of rotation of the encoder utilizing the received reshaped pulse signals for adjusting the image screen. The image screen adjustment is facilitated in a manner corresponding to the determined speed of rotation of the encoder wherein a faster rotation corresponds to faster image screen adjustment.

In one embodiment of the apparatus of the present invention, hardware circuitry and firmware routine are combined effectively to facilitate the image screen adjustment of the video display monitor, so that the hardware is implemented in a simplest configuration controlled by a small firmware routine to achieve ergonomic screen adjustments.

BRIEF DESCRIPTION OF THE DRAWING

Other objects, features, and advantages of the present invention will become apparent by way of the following detailed description of the preferred but non-limiting embodiments. The description is made with reference to the accompanying drawings in which.

DETAILED DESCRIPTION OF THE PREFERRED EMBODIMENT

Figure 1:
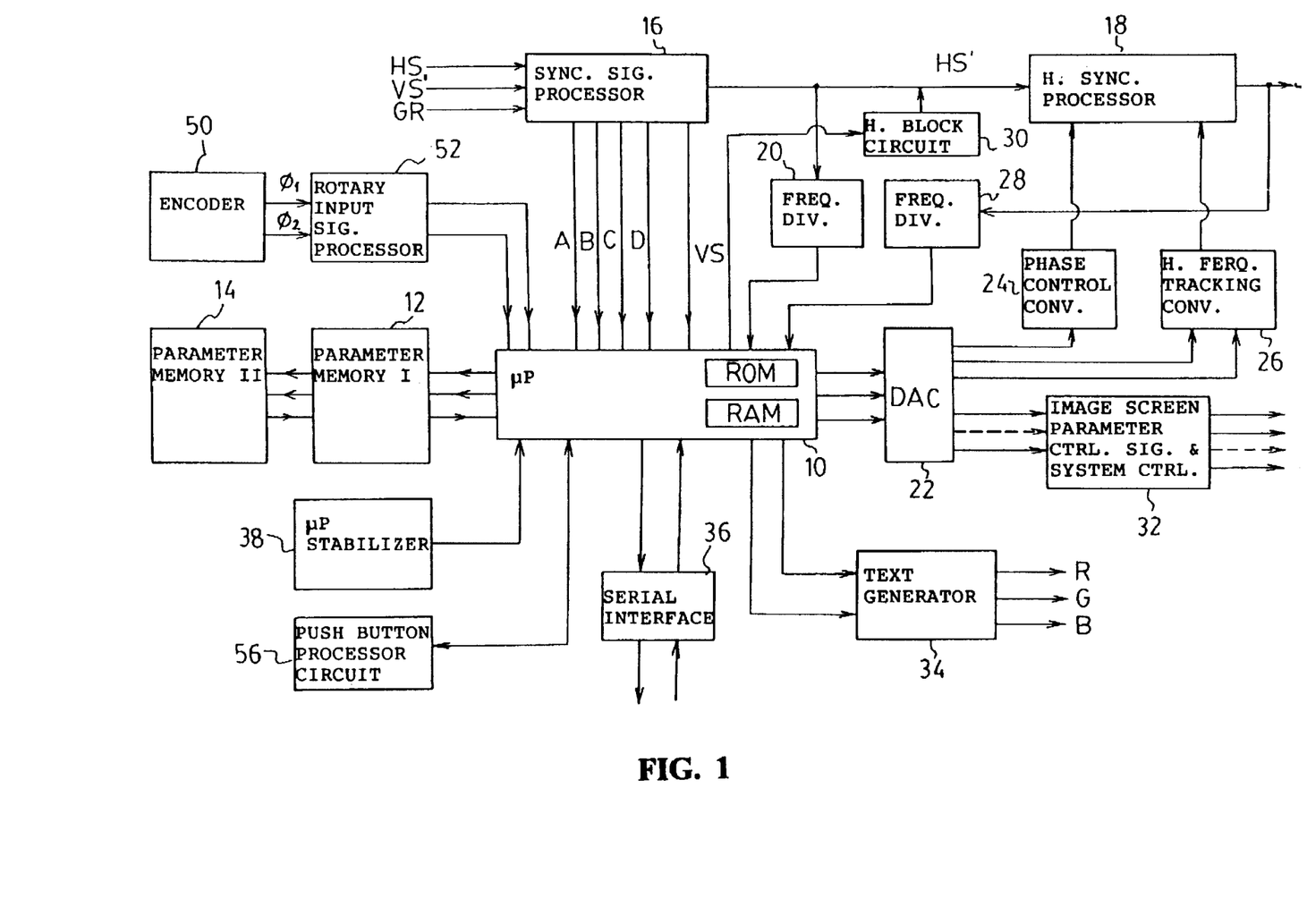
FIG. 1 shows a block diagram of the digital image screen adjustment apparatus for video monitors in accordance with a preferred embodiment of the present invention.

Refer to FIG. 1 of the accompanying drawing of the present invention. A block diagram of the digital image screen adjustment apparatus for video monitors in accordance with a preferred embodiment of the present invention is shown therein. In this described embodiment, a microprocessor 10 is utilized to execute a controlling scheme embedded in the firmware that implements the image screen adjustment functions for the video display monitor. The microprocessor 10 may be considered as the central processing unit (CPU) or the microcontroller unit (MCU) for the apparatus, depending on either it is a microprocessor or a microcontroller in nature. In this described example, a microprocessor is used. Microprocessor 10 includes its on-chip read-only memory (ROM) and random-access memory (RAM) for holding firmware program and operation-related data respectively. Essentially, the RAM is used to store the apparatus parameters and for storage of intermediate data necessary for its operation. The control apparatus of FIG. 1 also includes a first parameter memory 12 and a second parameter memory 14, which can be electrically erasable-programmable read-only memory (EEPROM) or any other similar memory device.

The first parameter memory 12 is utilized for the storage of important apparatus parameters and those user-specific parameters. The control scheme embedded in the firmware of the apparatus of FIG. 1 is designed to detect whether or not there is any parameter data held in the first parameter memory 12 after the very first time the power is applied to the apparatus for testing. If there was parameter data present in the first parameter memory 12, apparatus parameters will then be downloaded in memory 12. All parameter changed as a result of user adjustment to the apparatus will also be held in memory 12. Later apparatus operations will be based on these parameters held in the first parameter memory 12. The second parameter memory 14 is used for the storage of information needed by an on-screen display data frame, which will be described in detail in the following paragraphs. Because of the use of the first and second parameter memories 12 and 14, different requirements of the video display monitors from different customers may be fulfilled by changing different versions of the parameter memories 12 and 14 without having to alter the microprocessor hardware, as is required in the prior art cases. Monitor manufacturing may therefore be conducted in a manner with reduced costs and less schedule delay, together with increased flexibility, convenience and competitiveness.

A synchronization signal processor 16 is coupled with the microprocessor 10. It receives an external source (a display adapter of a host system, for example) of horizontal synchronization signal HS, vertical synchronization signal VS, and image signal GR and performs processing thereon to provide horizontal polarity signal A, vertical polarity signal B, horizontal signal C and vertical signal D, as well as vertical synchronization frequency signal VS' for the microprocessor 10. Meanwhile, the synchronization signal processor 16 also provides a horizontal synchronization frequency signal HS' to a horizontal synchronization processor 18 also connected thereto. Horizontal and vertical polarity signals A and B may each represent positive and negative polarities respectively, while horizontal and vertical signals C and D may each represent the presence or non-presence of the signals respectively. Combination of these four signals, with the addition of the detection capability to the vertical and horizontal frequencies provided by the microprocessor 10, allows to construct a video display monitor control and adjustment apparatus equipped with features of more flexibility. This means a more versatile functionality that can be driven by the various types of external signal source, the display adapter of the host system, in other words. In the apparatus of FIG. 1, the horizontal synchronization frequency signal HS' provided by the synchronization signal processor 16 to the horizontal synchronization processor 18, may also be sent to the microprocessor 10 via a frequency divider 20. This arrangement is based on the fact that horizontal synchronization signals typically have very high frequency that the microprocessor 10 can not handle directly. After frequency reduction in the frequency divider 20, the microprocessor 10 can detect the frequency the signal carries.

Horizontal synchronization processor 18 receives the horizontal synchronization frequency signal HS' from the synchronization signal processor 16, and releases a horizontal output signal under control of the microprocessor 10. Microprocessor 10 relies primarily on a digital-to-analog converter (DAC) 22, a phase control converter 24, and a horizontal frequency tracking converter 26 to control the horizontal synchronization processor 18 in its output of the precision horizontal output signal. Due to the fact that the electronic circuit characteristics of each of a number of manufactured controller logic circuitry, although all of the same model, would have slight discrepancies between each other, each of the controller logic circuit boards will require testing and factory adjustments in its phase control converter 24 as well as in horizontal frequency tracking converter 26. This allows for precision synchronization among the horizontal synchronization signal HS and the horizontal output signal generated by the horizontal synchronization processor 18.

A simple and convenient approach is adopted by the image screen adjustment apparatus for video monitor in accordance with the preferred embodiment of the present invention. Essentially, the horizontal output signal of the horizontal synchronization processor 18 would be processed by a frequency divider 28 before it is fetched to the microprocessor 10, in order to allow for the microprocessor 10 to detect the frequency of the horizontal output signal. Further, the control scheme embedded in the firmware of the apparatus of FIG. 1 is designed to have the microprocessor 10 implement its calculation, tracking and adjustment based on the feedback horizontal output signal in order to obtain the optimized control parameters that achieve in the most precision horizontal output signal frequency after the first time power is supplied to the apparatus for testing. Those obtained parameters are then written into its own memory locations, as well as in the first parameter memory 12 for later control implementation purposes. During the process the microprocessor 10 is performing this adjustment, a horizontal blocking circuitry 30 is utilized to cut off the horizontal synchronization frequency signal HS', so that it will no longer be input to the horizontal synchronization processor 18. In this manner, manual adjustments may be reduced to a minimum, resulting in the overall reduction in manufacturing time and costs.

Figure 2:
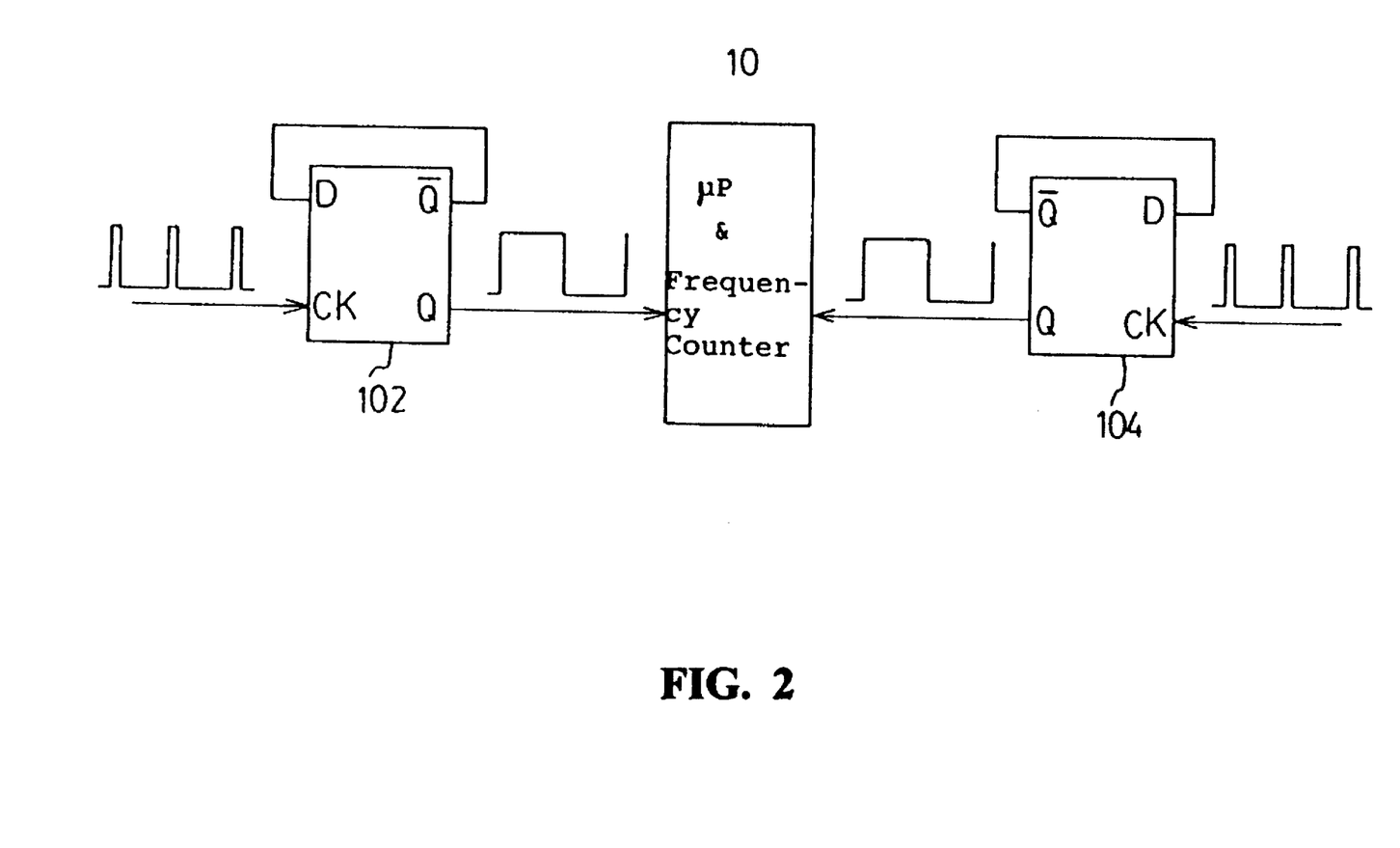
FIG. 2 schematically shows a pair of frequency-dividing D-type flip-flops used with the microprocessor.

Refer next to FIG. 2, which shows a pair of frequency-dividing D-type flip-flops 102 and 104 used with the microprocessor 10. The frequency divider 20 and 28 required in the apparatus of FIG. 1 may be constructed out of these D-type flip-flops 102 and 104. Each of the D-type flip-flops 102 and 104 has its D input fed by its own -Q output, while the horizontal synchronization frequency signal HS' output by the synchronization signal processor 16 and the horizontal output signal output by the horizontal synchronization processor 18 are input to their respective clock inputs CK. The Q output of both flip-flops 102 and 104 are then sent to the microprocessor 10, as is schematically seen in the drawing. D-type flip-flops 102 and 104 are in this instance each utilized as a ½ frequency divider. As the signal frequency sent to the microprocessor 10 is now divided by half, the signal pulse width is thus doubled to a level detectable by the microprocessor. In this manner, the microprocessor 10 is now able to detect signal frequencies that are substantially higher than it actually can.

Figure 3:
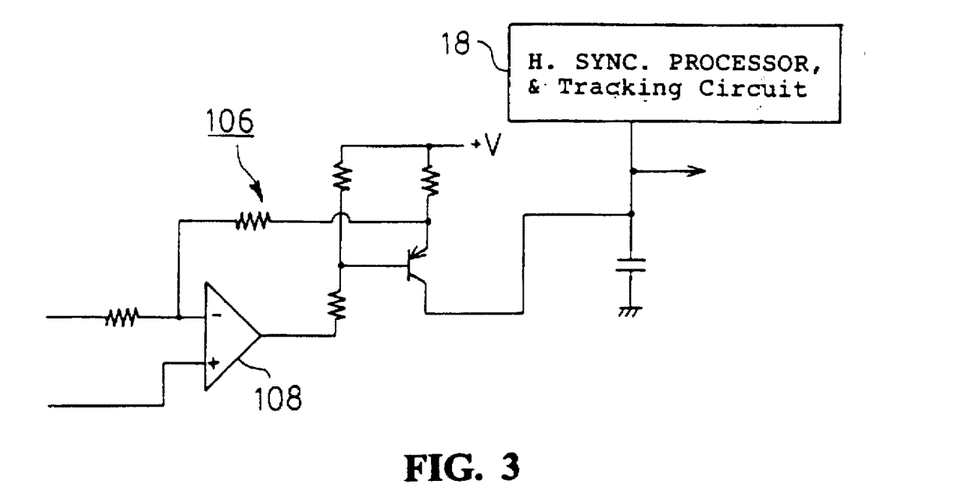
FIG. 3 shows the schematic diagram of the horizontal frequency tracking converter of the apparatus of FIG. 1 in accordance with a preferred embodiment of the present invention.

FIG. 3 shows the schematic diagram of the horizontal frequency tracking converter 26 of the apparatus of FIG. 1 in accordance with a preferred embodiment of the present invention. The converter 26 of FIG. 1, identified by reference numeral 106 in FIG. 3, is seen to comprise a power amplifier 108. Negative phase input of the amplifier 108 receives the main control voltage signal sent by the microprocessor 10 via the DAC 22, as is seen in FIG. 1. On the other hand, in a similar manner, positive phase input of the amplifier 108 receives the adjustment voltage signal sent by the microprocessor 10 also via the DAC 22. With this arrangement, the horizontal frequency tracking converter 106 is able to issue horizontal output frequency signal with high precision.

Figure 5A:
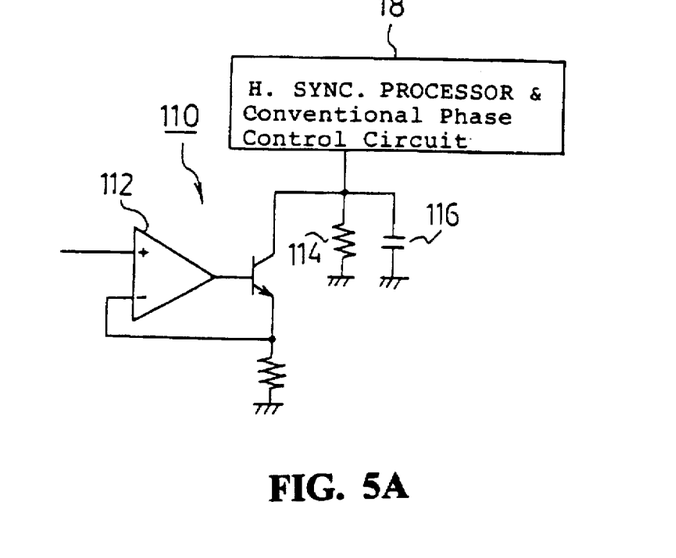
FIG. 5A shows the schematic diagram of the conventional phase control converter used in the apparatus of FIG. 1.
Figure 5B:
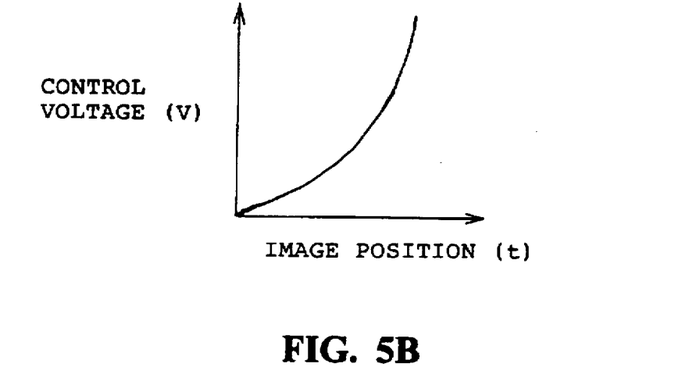
FIG. 5B shows the characteristic curve of the phase control converter of FIG. 5A.
Figure 6A:
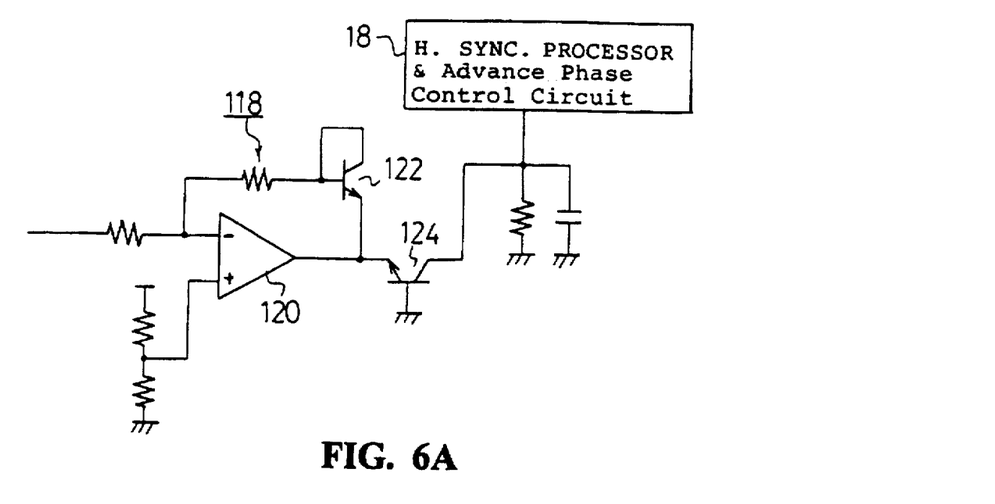
FIG. 6A shows the schematic diagram of the phase control converter for the apparatus of FIG. 1 in accordance with a preferred embodiment of the present invention.
Figure 6B:
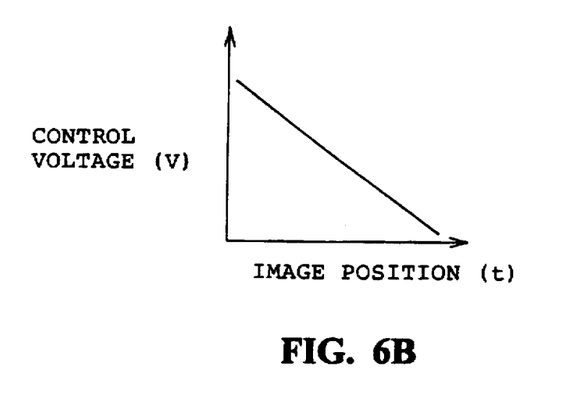
FIG. 6B shows the characteristic curve of the phase control converter of FIG. 6A.
Figure 6C:
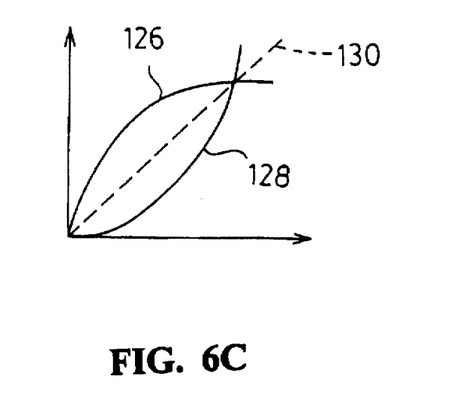
FIG. 6C schematically shows the RC time constant curve of the circuitry of FIG. 6A in comparison with the logarithmic characteristic curve of diodes.

FIG. 5A shows the schematic diagram of a conventional phase control converter 110 that can be used as the phase control converter 24 in the apparatus of FIG. 1. As is seen in the drawing, the power amplifier 112 that comprises the converter 110 has its positive phase input receiving control voltage signals via the DAC 22, as can be seen in FIG. 1. The major drawback of this conventional phase control converter 110 is reflected in the fact that the RC constant arising from the resistor 114 and capacitor 116 exhibits non-linear characteristics. This translates into the non-linear correspondence between the applied control voltage and the revealed display image shift. FIG. 5B shows this non-linear characteristic curve of the phase control converter 110 of FIG. 5A, expressing the image position (t) as a function of the applied control voltage (V). To avoid this problem, another phase control converter circuit 118 in accordance with a preferred embodiment of the present invention such as that depicted in FIG. 6A can be used instead. The power amplifier 120 of the converter circuit 118 has its negative phase input receiving the control voltage signal sent by the microprocessor 10 via the DAC 22. Essentially, the phase control converter circuit 118 employs two transistors 122 and 124 to constitute an equivalent circuit of a diode so that the logarithmic characteristics thereof may compensate the non-linearity inherent in the RC constant. A substantially linear correspondence relationship such as the one depicted in FIG. 6B may thus be established between the applied control voltage (V) and the image position (t). FIG. 6C schematically depicts the concept of this characteristics compensation. As is seen in the drawing, the RC time constant curve 126 of the circuitry of FIG. 6A is outlined for comparison with the logarithmic characteristic curve 128 of the equivalent diode comprising the transistors 122 and 124. The combined effectiveness of the curvatures 126 and 128 is the resultant virtually linear characteristic curve 130 shown in phantom line. This allows to establish a linear correspondence between the applied amount of adjustment given by the user of the video monitor and the actual amount of adjustment revealed in the change in the display screen. This is an adjustment control scheme more natural to the human user and compatible to the principles of ergonomic engineering.

With reference back to FIG. 1, it can be observed that the apparatus of the present invention also includes an image screen parameter control signal and apparatus controller 32. This controller 32 is indirectly controlled by the microprocessor 10 via the DAC 22 to output image screen parameter control signals and the control signals for the apparatus. Also, a text image generator 34 is included in the apparatus of FIG. 1 which is coupled to and controlled by the microprocessor 10 to generate text image signals.

Figure 4:
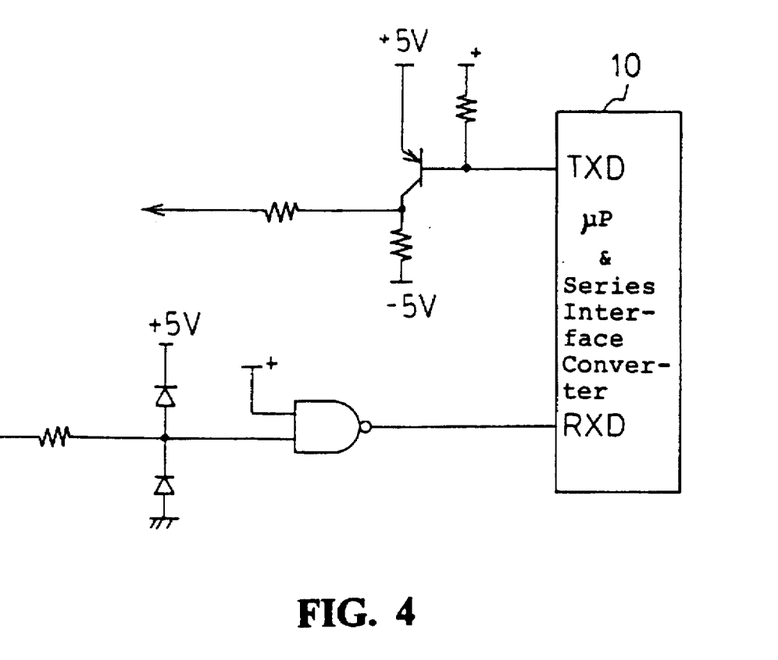
FIG. 4 shows the schematic diagram of the serial interface circuitry of the apparatus of FIG. 1 in accordance with a preferred embodiment of the present invention.

Still in FIG. 1, the video monitor control apparatus depicted is seen to further comprise a serial interface circuitry 36 coupled to the microprocessor 10. The serial interface circuitry 36 may, for example, comprise an RS-232 serial interface. This allows for the user of the apparatus to transfer data from the host to the video monitor to implement display image control or to modify the control parameters. FIG. 4 depicts a simple and low cost circuitry for the RS-232 serial interface in accordance with a preferred embodiment of the present invention. As is seen in FIG. 4, the input and output routes of the interface may be coupled to the RS-232-compatible RXD and TXD pins of the microprocessor 10 respectively.

Figure 7:
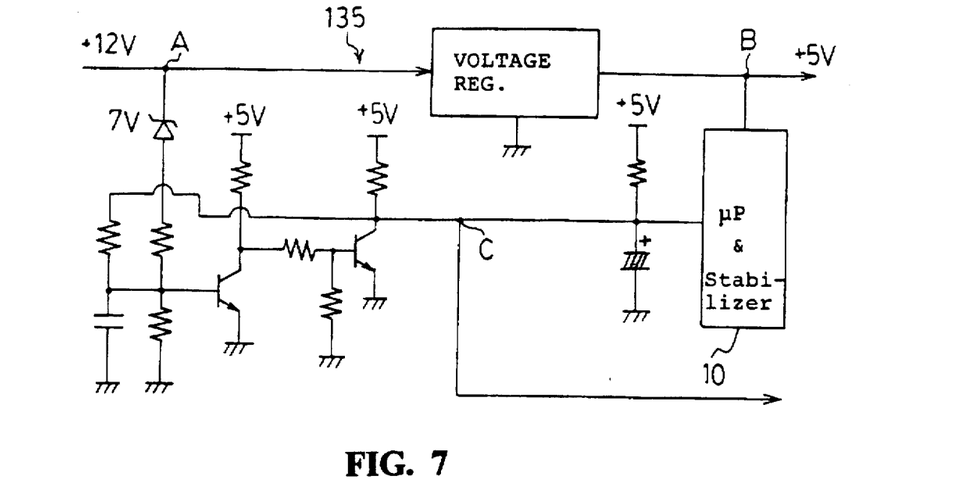
FIG. 7 shows the schematic diagram of the microprocessor stability securing circuitry of the apparatus of FIG. 1 in accordance with a preferred embodiment of the present invention.
Figure 8A:
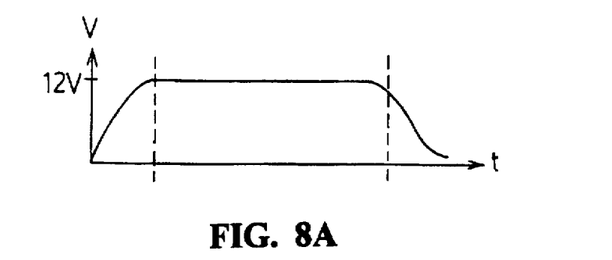
FIGS. 8A, 8B and 8C show the voltage characteristics expressed as a function of time measured at nodes A, B and C respectively in the microprocessor stability securing circuitry of FIG. 7.
Figure 8B:
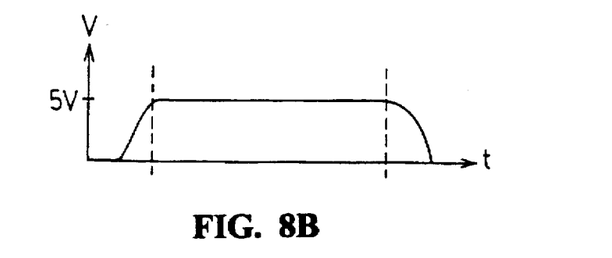
Figure 8C:
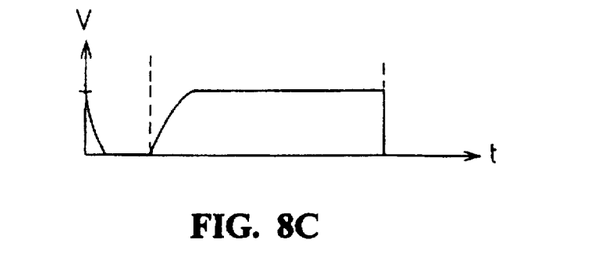

The video monitor control apparatus of FIG. 1 may further comprise a microprocessor stability securing circuitry 38 directly coupled to the microprocessor 10. As is well known by persons skilled in the art, most electronic circuitries, including IC logic circuitries, would exhibit unstable operation characteristics when the system power supply voltage is slowly rising or dropping as a result of a number of reasons. In particular, in occasions wherein the power supply voltage is gradually dropping, the microprocessor 10 may behave unpredictably and may lose the important data held in its internal memory locations. The result of this situation is the video monitor's failure to operate normally after the power supply is restored to normal status. To avoid this problem, a microprocessor stability securing circuitry 38 is provided for the inventive apparatus in accordance with a preferred embodiment of the present invention. In essence, securing circuitry 38 helps to prevent events such as power supply voltage drop from interfering with the normal operation of the microprocessor 10. The securing circuitry 38 prevents critical data internal to the microprocessor 10 from being destroyed in those occasions of power supply voltage variations. FIG. 7 shows the schematic diagram of the microprocessor stability securing circuitry 38 for the apparatus of FIG. 1 in accordance with a preferred embodiment of the present invention. In the drawing of FIG. 7, the microprocessor stability securing circuitry is identified by the reference numeral 135. FIGS. 8A, 8B and 8C show the voltage characteristics expressed as a function of time measured at nodes A, B and C respectively in the microprocessor stability securing circuitry 135 of FIG. 7. As can be observed in FIG. 8C, the voltage at node C, which is the node directly coupled to the power supply pins of microprocessor 10, there is no voltage drop phenomena when there is a drop in node A, the input to the securing circuitry 135. This stabilizes the operation of the microprocessor 10 and prevents any possibility of data loss in occasions of power supply instability.

Figure 12:
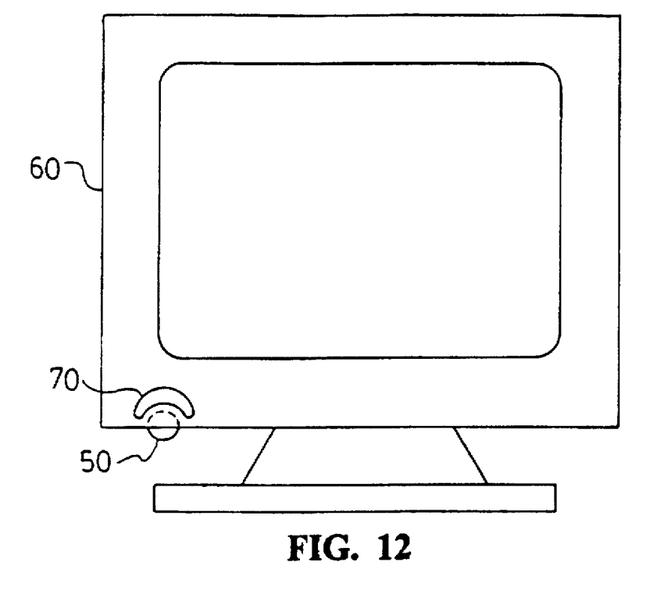
FIG. 12 schematically shows the front view of a video display monitor employing the image screen adjustment apparatus of the present invention.

With reference back again in FIG. 1, the image screen adjustment control apparatus relies primarily on the use of a digital encoder 50 that is a rotary knob and a rotary input signal processor 52 for achieving its functionality of adjustment. The encoder 50 is coupled to the microprocessor 10 via the rotary input signal processor 52. The encoder 50 can be positioned at the proper location on the control panel of the monitor 60, as is schematically depicted in FIG. 12. This allows for the user of the video display monitor 60 to facilitate display image screen adjustment with fingers easily. As the encoder 50 is rotated in either direction, two signals $\phi_1$ and $\phi_2$ will be output by the encoder 50 which are streamed into the rotary input signal processor 52 for processing. The use of the rotary input signal processor 52 is necessary because raw signals $\phi_1$ and $\phi_2$ generated by the encoder 50 will usually carry along noise signals as they are generated either by mechanical or optical encoding means that would confuse the microprocessor 10 if directly input thereto. The role of the rotary input signal processor 52 is to take the raw signals $\phi_1$ and $\phi_2$ and eliminate the noise signals contained therein, and turn them into proper pulse waves before can be sent to microprocessor 10 for processing.

Figure 9:
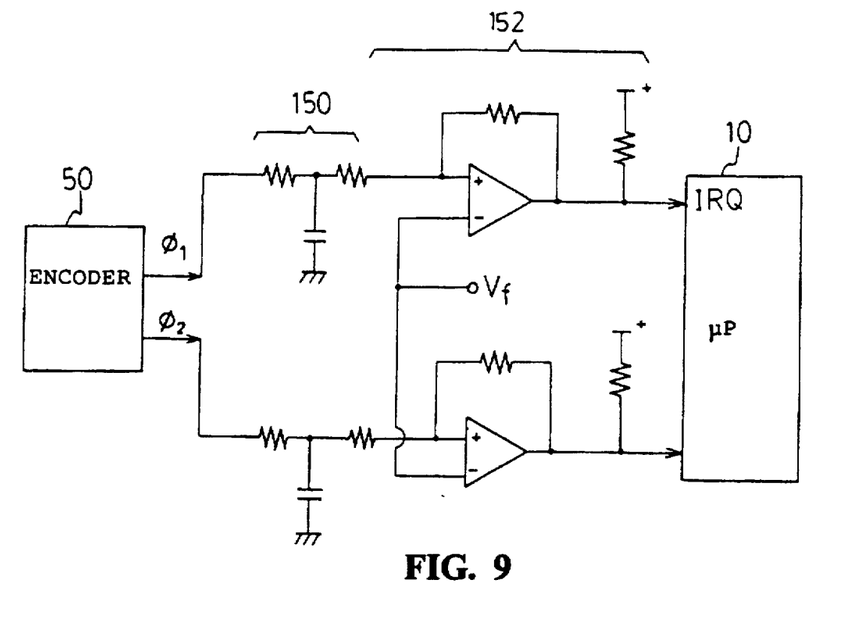
FIG. 9 shows the schematic diagram of the rotary input signal processor for the apparatus of FIG. 1 in accordance with a preferred embodiment of the present invention.
Figure 10A:
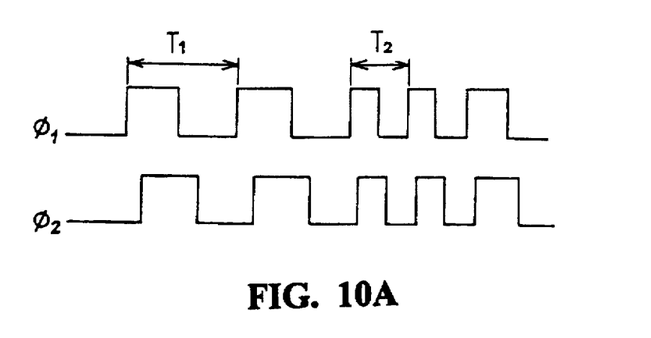
FIGS. 10A and 10B respectively show the signals generated by the encoder of the apparatus of FIG. 1.
Figure 10B:
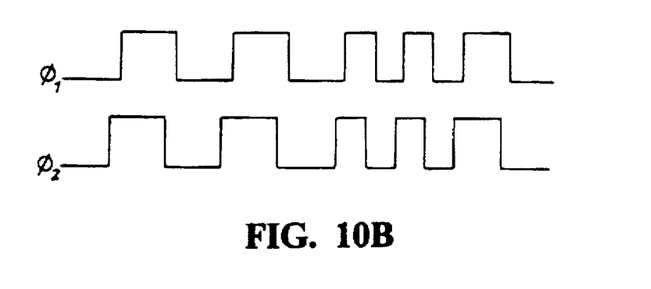

FIG. 9 shows the schematic diagram of the rotary input signal processor 52 for the apparatus of FIG. 1 in accordance with a preferred embodiment of the present invention. Meanwhile, FIGS. 10A and 10B respectively show the signals generated by the encoder 50 of the apparatus of FIG. 1. Among the two signals, $\phi_1$ is used to signify the speed of rotary knob rotation effected by the user of the video monitor adjusting the image screen. Higher rotational speed in the knob will be translated into a sequence of pulse waves having higher frequency, or smaller pulse width, in other words. For example, in the pulse train of FIG. 10A, the pulse having the period identified by $T_1$ is signifying that its rotational speed is slower than that represented by period $T_2$ that follows. The other signal $\phi_2$, as output by the encoder 50, is utilized to signify the direction of the adjustment rotation. This control knob rotational direction recognition is achieved by comparing the relative time phase between the two signals $\phi_1$ and $\phi_2$. Specifically, in the example of FIG. 10A, the signal $\phi_2$ is seen to lag behind the other signal $\phi_1$, a condition signifying that the control knob is being turned in one direction, say the clockwise direction. On the other hand, as in the situation of FIG. 10B, wherein signal $\phi_1$ lags behind the other $\phi_2$, which is signifying another condition that the control knob is being turned in the other direction, the counterclockwise direction.

As mentioned above, signals $\phi_1$ and $\phi_2$ normally carry along noises with them and require reshaping by the rotary input signal processor 52 before the microprocessor 10 can process them. In the schematic diagram of FIG. 9, an embodiment of the processor 52 is depicted in accordance with the present invention. Since each of the two signals $\phi_1$ and $\phi_2$ requires the same reshaping circuitry, therefore only the circuitry for one signal, $\phi_1$, will be described. As is seen in the schematic diagram, signal $\circledR_1$ is first passed through a filter 150 comprising a network of resistor and capacitor and then through a shaping comparator 152 for producing a proper pulse wave form that the microprocessor 10 can process.

Encoders are varied in specifications. High precision ones are capable of generating a couple of hundreds of pulses per revolution, but with extremely high costs. These encoders are not suitable for use in consumer video display monitors, simply because they are expensive. On the other hand, those encoders suitable for use in video monitors in terms of price can generate only about 13 to 15 pulses per revolution. Considering the use of 8-bit image screen parameters in conventional video monitors, the 256 resolution steps ($2^8 = 256$) would be excessive for an encoder generating only about 15 pulses per revolution. Almost 20 revolutions will have to be used to cover the entire adjustment range. An enhancement for the use of these low cost encoders as proposed by the present invention may employ the factor of adjustment speed as applied by the user of the monitor to reduce the number of revolutions that are required to cover the 256 resolution steps. The inventive enhancement makes use of software means to facilitate an equivalent adjustment effectiveness that a conventional variable resistor rotary knob can provide. Specifically, the very software routine can be designed to treat one received signal pulse $\phi_1$ as a single adjustment resolution step when the control knob of the encoder 50 is turned slowly. On the other hand, when the knob is turned in a faster manner, one received pulse will be treated as representing a multiple number of adjustment resolution steps, the faster the knob is turned, the more the resolution steps are represented by a single signal pulse. This provides a real feeling of a human interface to the adjustment knob.

For clarity of the description of the apparatus of the present invention, a substantial embodiment of the inventive apparatus will be given below. If an encoder 50 was producing a signal pulse having a period of $T \geq 57.3$ ms, then a resolution step would be assigned to each generated pulse. If the encoder 50 was producing a signal pulse having a period of $T < 57.3$ ms, then the following adjustment resolution steps would apply.

TABLE I

| Period T | Parameter Value $x_1$ After Adjustment | Period T | Parameter Value $x_1$ After Adjustment |
|---|---|---|---|
| 9.1 ms ≦ T < 57.3 ms | $x_1 = x + 1$ | 26.6 ms ≦ T < 28.6 ms | $x_1 = x + 7$ |
| 0.9 ms ≦ T < 49.1 ms | $x_1 = x + 2$ | 24.5 ms ≦ T < 26.6 ms | $x_1 = x + 8$ |
| 6.8 ms ≦ T < 40.9 ms | $x_1 = x + 3$ | 22.5 ms ≦ T < 24.5 ms | $x_1 = x + 9$ |
| 2.7 ms ≦ T < 36.8 ms | $x_1 = x + 4$ | 20.4 ms ≦ T < 22.5 ms | $x_1 = x + 10$ |
| 0.7 ms ≦ T < 32.7 ms | $x_1 = x + 5$ | 18.4 ms ≦ T < 20.4 ms | $x_1 = x + 11$ |
| 3.6 ms ≦ T < 30.7 ms | $x_1 = x + 6$ | T < 18.4 ms | $x_1 = x + 12$ |

In the Table I listed above, x represents the original parameter values.

Based on the above exemplified embodiment, since only one encoder 50 is utilized to implement all the adjustment function for a video display monitor, therefore, a function key 70 as seen in FIG. 12 will be provided in addition to the single control knob 50 coupled to the encoder 50, so that different adjustment functions can be selected via selection from an on-screen display (OSD). FIG. 12 schematically shows the front view of a video display monitor employing the image screen adjustment apparatus of the present invention. Function key 70 is coupled indirectly to the microprocessor 10 via a push button processor circuitry 56, as is seen in FIG. 1, for providing the key depression signals thereto. As persons skilled in the art may well appreciate, more than one encoder control knobs may be employed, without the use of the function key 70, to implement the functionality of the present inventive apparatus. A software routine will be examined below utilizing the hardware apparatus described in the accompanying drawings in the previous paragraphs.

Figure 11:
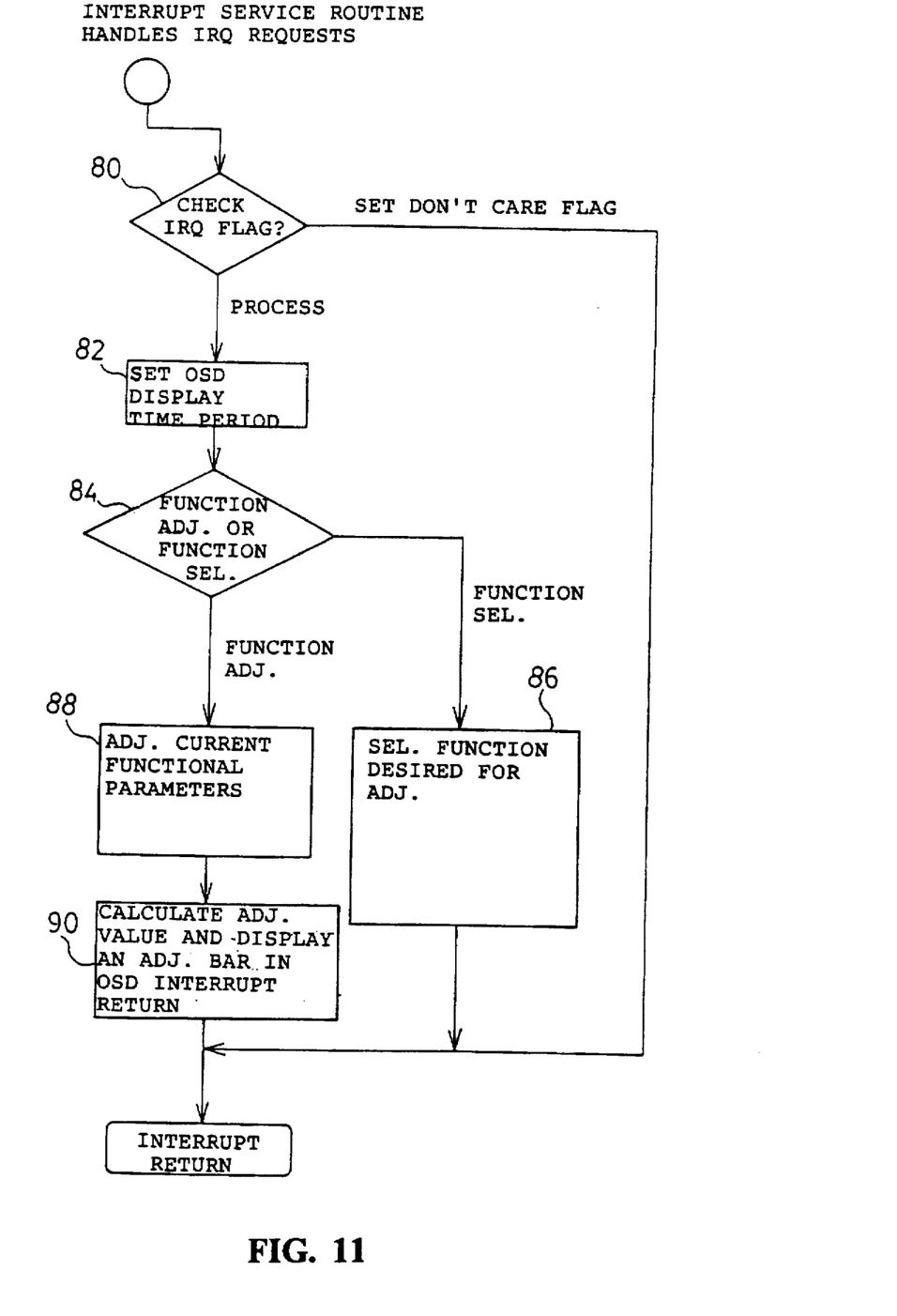
FIG. 11 is a flow chart showing the firmware control procedure of the image screen adjustment apparatus in accordance with a preferred embodiment of the present invention.
Figure 13:
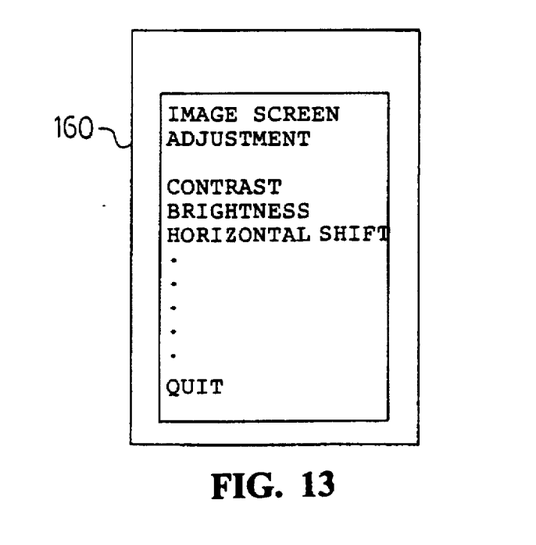
FIG. 13 schematically shows an example of displaying the on-screen data frame on the video display monitor employing the image screen adjustment apparatus of the present invention.
Figure 14:
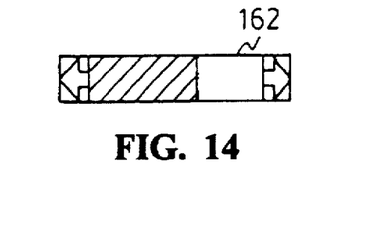
FIG. 14 schematically shows an example of an adjustment bar used for the on-screen data frame of FIG. 13.

FIG. 11 is a flow chart showing the firmware control procedure of the image screen adjustment apparatus in accordance with a preferred embodiment of the present invention. The firmware scheme begins with a check of interrupt request (IRQ) flag at step 80. If there were no interrupt request represent, a don't care flag is set and the routine proceeds to return from the interrupt processing routine, and control then returns to the calling main program. If there were interrupt request in queue, the routine proceeds to step 82 for initiating the IRQ service procedure and set up a time period for the user to respond. When a user of the video monitor wishes to adjust the image screen display characteristics, the push button 70 on the monitor control panel can be depressed, as in FIG. 12. The apparatus responds by displaying the OSD at step 84, as is shown in FIG. 13. FIG. 13 schematically shows an example of displaying the on-screen data frame on the video display monitor employing the image screen adjustment apparatus of the present invention. The messages included in the OSD are information retrieved from the second parameter memory 14 (FIG. 1) and displayed utilizing text fonts generated by the microprocessor 10 utilizing the text image generator 34. FIG. 13 shows an example of the content of an OSD 160 to include adjustments for display characteristics such as contrast, brightness, horizontal shift, as well as a selection to quit the selection. After the selection is offered in step 82 of the flow chart of FIG. 11, if no selection was made within specified time period after the OSD 160 was presented, the OSD will disappear, signifying that the user had aborted the adjustment. If the user intended to make an adjustment, a selection will be made at step 84 to proceed to function selection or function adjustment. On the selection menu provided by OSD 160, the user can implement the selection by utilizing the encoder control knob 50 at step 86 to move through the displayed menu, with the selected item identified by a reverse video on the screen. At the desired selection item, the user can depress the function key 70 to submit the selection. After the function selection is determined, at step 88 the user can again utilize the control knob 50 to implement the adjustment of the selected function. At this instance, in step 90, an on-screen adjustment bar 162 will be displayed covering, for example, the "quit" item on the OSD 160. FIG. 14 schematically shows an example of an adjustment bar used for the on-screen data frame of FIG. 13. As the user implements the adjustment of the selected function, the on-screen adjustment bar 162 can be used to show the status of adjustment, for example, the level of contrast adjustment when it is the image contrast being adjusted. Then, after the function adjustment is concluded, the routine will stop the interrupt service procedure.

While the present invention has been described by way of example and in terms of preferred embodiments, it is to be understood that the invention need not be limited to the disclosed embodiments. It is intended to cover various modifications and similar arrangements included within the spirit and scope of the appended claims, the scope of which should be accorded the broadest interpretation so as to encompass all such modifications and similar structures.

I claim:

1. An image screen adjustment apparatus for video display monitor devices comprising:

a microprocessor for implementing operating and adjustment control of said monitor;

an encoder included in said monitor device for a user of said monitor device to rotate in a clockwise or counterclockwise direction for generating a pair of pulse signals; and a rotary input signal processor means coupled between said microprocessor and said encoder for receiving said pair of pulse signals generated by said encoder and for reshaping said pulses for input to said microprocessor;

wherein said microprocessor receives said reshaped pulse signals for determining the direction of rotation and the range of rotation of said encoder, said determined direction and range of rotation being utilized as the basis for the adjustment of said image screen of said video monitor device.

2. The image screen adjustment apparatus of claim 1, wherein said microprocessor further determines the speed of rotation of said encoder utilizing said received reshaped pulse signals for adjusting said image screen, said image screen adjustment being effected in a manner corresponding to said determined speed of rotation of said encoder wherein a faster rotation corresponds to faster image screen adjustment.

3. The image screen adjustment apparatus of claim 2, further comprising:

a function key located on a control panel of said video monitor device;

a push button processor circuitry means coupled between said function key and said microprocessor;

a memory means coupled to said microprocessor for holding image screen data frame display data; and an image screen data frame display processor means coupled to said microprocessor for displaying an on-screen adjustment function list on said image screen of said video display monitor device; whereby said microprocessor controlling said image screen data frame processor means based on said image screen data frame display data held in said memory means to display said on-screen adjustment function list on said image screen when a user of said video display monitor device depresses said function key, allowing for said user to select a desired adjustment function utilizing said encoder by said encoder in either direction of rotation.

4. The image screen adjustment apparatus of claim 3, wherein said microprocessor further displays an adjustment bar on said image screen for advising the status of said adjustment when said user selected said adjustment function from said displayed list.

5. The image screen adjustment apparatus of claim 4, wherein said rotary input signal processor means further comprises a filter coupled to said encoder for receiving and filtering said pair of pulse signals, and a reshaping comparator means coupled between said filter and said microprocessor for reshaping said filtered pulse signals into proper pulse signals for input to said microprocessor.

* * * * *